United States Patent [19]
Harris et al.

[11] 3,953,706
[45] Apr. 27, 1976

[54] LASER BENT BEAM CONTROLLED DWELL WIRE STRIPPER

[75] Inventors: Charles W. Harris; Allen C. Layton; Robert E. Howle, all of Orlando, Fla.

[73] Assignee: Martin Marietta Corporation, Orlando, Fla.

[22] Filed: Dec. 4, 1974

[21] Appl. No.: 529,553

Related U.S. Application Data
[63] Continuation of Ser. No. 456,418, March 29, 1974, abandoned.

[52] U.S. Cl. .............................. 219/121 L; 350/6; 81/9.5 R
[51] Int. Cl.² .......................................... B73K 27/00
[58] Field of Search... 219/121 L, 121 LM, 121 EB, 219/121 EM, 85, 50, 349; 331/DIG. 1; 350/6, 7, 285, 286; 81/9.5 R; 30/140; 29/427, 203, 497.5

[56] References Cited
UNITED STATES PATENTS

| | | | |
|---|---|---|---|
| 2,858,453 | 10/1958 | Harris | 350/7 X |
| 3,381,570 | 5/1968 | Anway et al. | 350/6 X |
| 3,534,472 | 10/1970 | DeJong et al. | 219/121 LM |
| 3,622,222 | 11/1971 | Remy et al. | 350/285 X |
| 3,629,891 | 12/1971 | Morrone | 219/349 X |
| 3,642,343 | 2/1972 | Tehejeyan et al. | 350/6 |
| 3,646,307 | 2/1972 | Hazel | 219/85 X |
| 3,659,332 | 5/1972 | Morrone | 81/9.5 R |
| 3,667,328 | 6/1972 | Stolshek | 81/9.5 R |
| 3,755,646 | 8/1973 | Muller | 219/121 LM |
| R25,105 | 12/1961 | Cargill, Jr. | 219/68 |

OTHER PUBLICATIONS
"High-Energy Arc Wire Insulation Removal Tool" by Desautels and Schick, IBM Technical Disclosure, Vol. 13, pp. 37-56, 1971.

"Triple Twist Wire Preparation by $Co_2$ Laser" by Haas, IBM Technical Disclosure, Vol. 13, p. 3794, 1971.

*Primary Examiner*—J. V. Truhe
*Assistant Examiner*—G. R. Peterson
*Attorney, Agent, or Firm*—Julian C. Renfro; Gay Chin

[57] ABSTRACT

A device for enabling the stripping of a selected portion of the insulation from an electrical lead on a rapid basis without damage to the conductor portion of the lead, involving the use of a rotatable optical unit. Our novel optical unit is equipped with an aperture at each end, with a first of these apertures being configured to selectively receive a variety of types of electrical leads whose ends are to be stripped of insulation for a certain length, and the second aperture being arranged to receive output energy from an adjacently located laser operating at a wavelength and power level such as will cause ablation of insulation at the specified location on the electrical lead. These apertures are located on the axis of rotation of the optical unit, and optical components are utilized in the unit such as will direct and focus a laser beam at essentially right angles to a nonrotating lead inserted through the first aperture. As a result of the rotation of the optical unit, a circumferential cut may be made in the insulation of the electrical lead at the location selected by the user, thus enabling the removal of such selected portion of the insulation from the conductor or conductors of the lead. Our novel optical unit can also be utilized in a nonrotating mode as will enable a longitudinal cut to be made in an electrical lead as it is being withdrawn from the unit, or in a mode involving a withdrawal of the lead during slow rotation of the unit, thus enabling a helical cut of a type particularly desirable in the removal of insulation from a twisted lead.

22 Claims, 9 Drawing Figures

FIG. 9

LASER BENT BEAM CONTROLLED DWELL WIRE STRIPPER

CROSS REFERENCE TO RELATED CASE

This application is a continuation of application Ser. No. 456,418, filed Mar. 29, 1974, now abandoned.

BACKGROUND OF THE INVENTION

Many forms of wire strippers are known in the art, with a wide variety of strippers, both manually operated and automatic, being employed in the removal of insulation from the conductor or conductors utilized in an electrical wire.

In many types of insulation, mechanical type wire strippers work quite well, for in the instance in which the wall thickness is comparatively great, the blades of a mechanical device can be set to cut say 80% of the way through the insulation, and thereafter the end portion of the insulation pulled on to cause severing of the insulation at the weakened location. Properly operating mechanical strippers of this type do not damage the conductor as long as the blades stop short of contacting the conductor.

The problem of insulation removal is intensified, however, when in the saving of space, designers call for the use of conductors having thinwalled insulation. This is so because it is virtually impossible to design and operate mechanical blades that will cut through thinwall insulation sufficiently far that the insulation can thereafter be pulled apart at the proper location, without the blades from time to time damaging the conductor.

For reasons of the inadequacy of mechanical strippers for use in connection with the stripping of thin wall insulation and the like, there has been an increased use of hot wire type strippers, which involve one or two heated filaments that can be brought into contact with the insulation, to cause degrading thereof at a desired location. The hot wire type stripper, if properly used, enables thin walled insulation to be removed without damaging the conductor, but by and large, a noncontrolled stripping operation is involved, with the skill of the operator in properly removing the insulation being entailed to a marked degree if damage to the insulation remaining on the wire is to be avoided.

A particularly challenging problem is involved when the insulation to be stripped is made of asbestos, woven glass, some combination of these, or the combination of one of these with another material. Both the mechanical type stripper as well as the hot wire stripper are inadequate in most such instances, and to the best knowledge of the present inventors, the only acceptable procedure for removing many of the tough, high temperature insulations such as Kapton, H-Film and the like is by an operator utilizing a knife. This obviously is a slow and tedious procedure, with the conductor or conductors inside the insulation being removed, often being nicked or otherwise damaged during the stripping procedure.

SUMMARY OF THE INVENTION

It is a primary purpose of the present invention to provide a wire stripper utilizing laser energy in such a manner as to safely, rapidly, and selectively remove all types of insulation from wires and leads, without it being necessary for the lead to be rotated, thus making it possible for the end of a roll of wire to be easily stripped.

In order that this and other goals of this invention may be accomplished we provide in accordance with this invention, a rotatable optical unit having an aperture at each end, with the wire to be stripped being insertable in one of such apertures, and laser energy being received in the other aperture. Appropriate optical components are utilized inside the unit as will enable the received laser energy to be focused at a preascertained location just inside the aperture into which the wire to be stripped can be inserted.

Provided inside the rotatable optical unit are means that can be adjusted in such a manner as to control the depth of insertion of a lead whose end is to be stripped, thus enabling the operator to precisely determine the length of insulation that is to be removed. Other adjustments enable the focus of the laser energy to be set such that the beam will impinge at an optimum depth location on the insulation.

We prefer to utilize a shutter type arrangement that normally blocks the laser beam from impinging upon the insulation of the inserted lead until such time as the operator by a deliberate effort, such as by stepping on a foot pedal, causes the shutter to move out of its blocking position, thus making it possible for the operator to precisely control the length of time that the laser beam can act upon the insulation.

Other controls that are provided make it possible for the operator to selectively adjust the power level of the laser, the speed or rotation of the optical unit, the direction of rotation of the optical unit, and the like.

By starting with low power levels when dealing with an unknown insulation, an operator can gradually achieve an optimum setting of the various controls associated with our machine, so that after an initial period of investigation, he or she can evolve criteria that will enable rapid yet safe removal of the insulation from a series of leads, while at all times leaving the insulation remaining on each lead entirely undamaged. As is obvious, a chart or table can be evolved advising operators of the appropriate power levels, rotational speeds, and exposure times to utilize with electrical leads having various types of insulation and controls for the focus enable the focus of the laser energy to be changed each time a change of lead diameter becomes involved. After appropriate settings have been made insofar as the length of lead to be stripped and the focus of the optical unit are concerned, an operator can thereafter strip in an entirely accurate, uniform and safe manner, literally dozens, hundreds, or even thousands of leads to a specific length, despite the fact that such leads are covered with the toughest known form of insulation.

It therefore is a primary object of this invention to provide a novel method and apparatus for the rapid removal of insulation from electrical leads without damage to the conductor portion thereof.

It is another object of this invention to provide a novel method and apparatus for the rapid and effective removal of insulation from electrical leads in instances in which the insulation material is extremely difficult to strip by conventional methods.

It is still another object of this invention to provide a laser wire stripper that will function to rapidly and safely remove insulation from leads, particularly leads covered with difficult-to-remove insulation, without the necessity of the lead whose end is being stripped having to be rotated during the insulation removal procedure.

It is yet another object of our invention to provide a laser wire stripper that will remove a selected amount of insulation from the end of each lead inserted therein, with the amount of insulation removed being consistent over a large number of leads stripped in this manner.

It is yet still another object of our invention to provide a laser wire stripper in which operating criteria such as the power level put out by the laser and the focal point of the laser energy can be varied easily on a case by case basis;

It is another object of our invention to provide a laser wire stripper utilizing a rotatable optical unit in which means are provided for changing the size lead that can be accommodated and the focal point of the laser beam, thus to make it possible to concentrate the laser beam on the surface of the insulation to be removed from each lead.

It is another object of our invention to provide a laser wire stripper utilizing a novel optical unit that can be caused to rotate at such time as a circumferential cut is to be made in the insulation of a given lead, and thereafter stopped in its rotation so as to enable a longitudinal cut to be made, this latter capability being particularly important in the instance in which the insulation is difficult to remove, even after a circumferential cut has been completed.

It is another object of our invention to provide a laser wire stripper in which the withdrawal of a lead from the device can be automatically accomplished, thus to enable a uniform longitudinal cut to be made.

It is another object of our invention to provide a laser wire stripper in which slow rotation of the optical unit can be coordinated with controlled withdrawal of the lead, thus to make possible a helical cut that is of particular assistance in the removal of tough insulation from twisted leads.

It is another object of our invention to provide a laser wire stripper adapted to make a circumferential cut at a selected location on an electrical lead, which cut is accomplished in such a manner as to leave the insulation straight and square, and without damaging the conductor.

It is another object of our invention to provide a laser wire stripper having means enabling an operator to easily select the length of insulation to be stripped, the intensity of the cutting beam, the time duration of the cut, and the location at which the collimated laser beam is focused on the insulation.

These and other objects, features and advantages will be more apparent from an inspection of the appended drawings in which.

DETAILED DESCRIPTION

Figure 1:
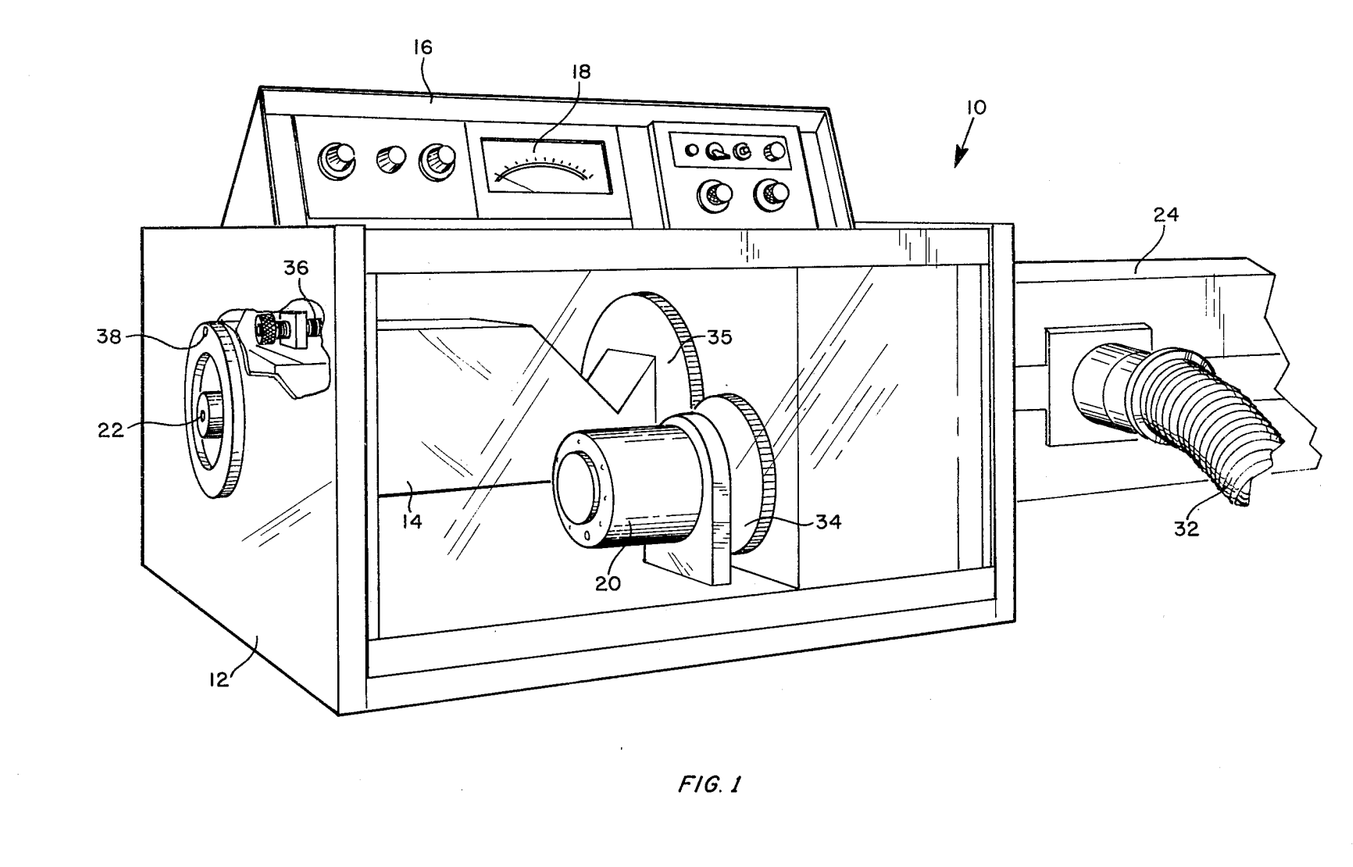
FIG. 1 is a perspective view of a preferred embodiment of our invention, involving a rotatable optical unit adjacent to which is a laser whose energy is to be directed into such unit for the stripping of insulation from wires inserted into the unit.

Turning to FIG. 1, it will there be seen that we have provided an exemplary version of a laser wire stripping machine 10 in accordance with this invention, involving a cabinet 12 in which a rotatable optical arrangement 14 is provided. A control panel 16 is utilized on top of the cabinet in order to make conveniently available, all of the controls necessary for effective operation of this device, and also to provide a clearly visible location for the meter 18 that indicates the laser output power being utilized at a given moment.

The rotatable optical arrangement 14 is driven in rotation by an electric motor 20, which is preferably a variable speed, reversible motor made by Bodine, Type No. NSH-11DC, Model No. 527XHO11. However, we obviously are not to be limited to this. As a result of the rotation of the optics, an insulated wire whose insulation is to be removed from one end thereof may be inserted into orifice 22, with a laser beam that has been redirected by the rotating optical arrangement 14 being allowed to impinge upon the insulation around the lead and to cause a desired ablation thereof. Significantly, the lead inserted into the orifice 22 does not need to rotate during the insulation-removing procedure, and after setting the machine to remove a certain length of insulation from each wire or lead inserted, a virtually unlimited number of leads may thereafter be stripped, and with a high degree of uniformity.

Figure 2:
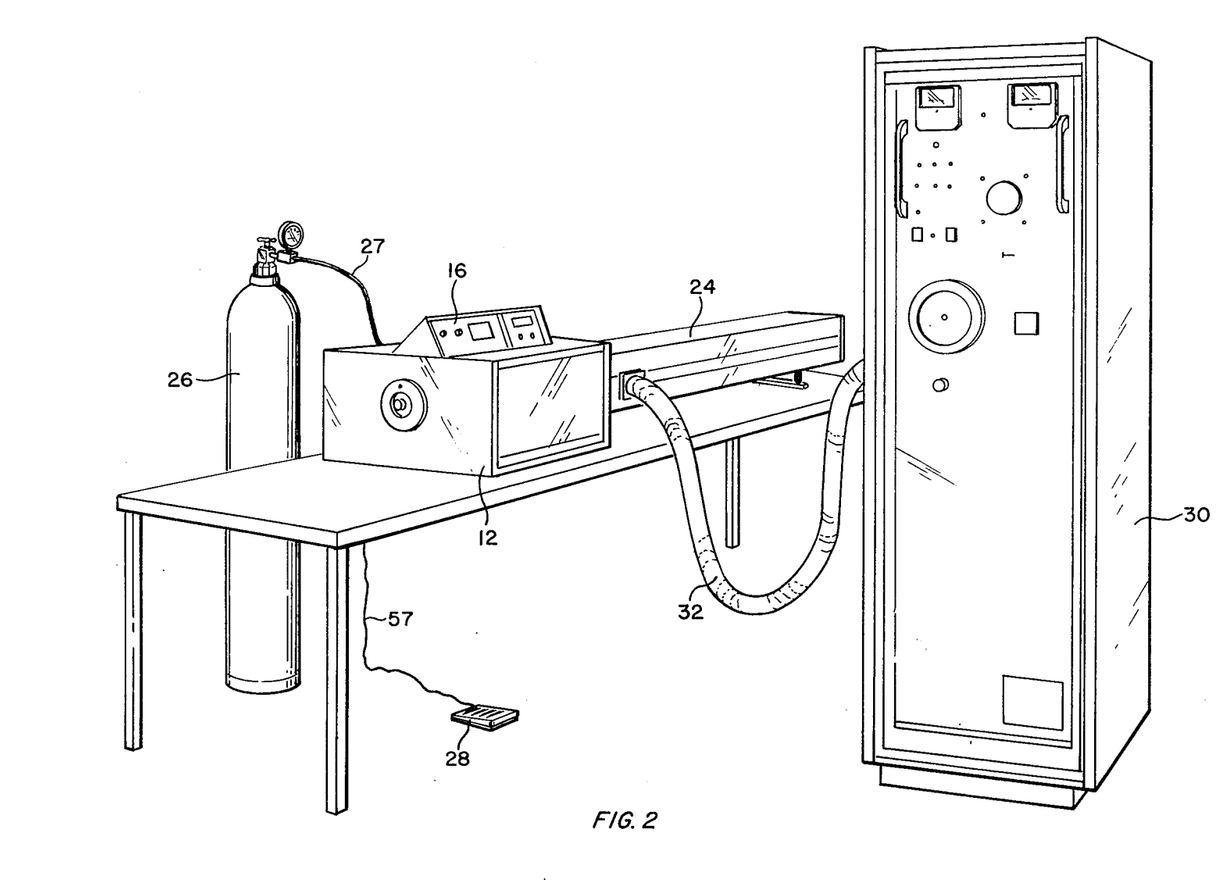
FIG. 2 is a perspective view to a larger scale to reveal other components utilized in conjunction with our wire stripper, including the control console employed for controlling the output of the laser.

Although we are not to be limited to such, we preferably utilize a $CO_2$ laser operating at or near 10.6 $\mu$ which laser is preferably located near the cabinet 12 such as in a housing 24. This housing is only partially shown in FIG. 1, and somewhat better revealed in FIG 2. The control of the laser is brought about by appropriate manipulation of the controls provided in contro console 30 visible in latter figure, which control con sole is interconnected by an umbilical 32 with the hous ing 24, with the umbilical being a flexible tube contain ing electrical, vacuum, gas and cooling water lines fron the console. A tank 26 for nitrogen, or other suitablt purge gas may be disposed adjacent the rear of cabine 12, as revealed in FIG. 2.

The previously-mentioned meter 18 disposed in the control panel 16 is typically a watt meter designed to reveal the power level represented in the laser bean entering the cabinet 12 from the housing 24. Control on the left side of the meter 18 as viewed in FIG. 1 are for example, a zero adjustment knob for the meter movement, range selection knob and the like, whereas controls on the right hand side of the meter 18 are associated with control of the drive motor 20. These latter include an on/off switch, a knob for controlling motor speed, a switch for controlling the direction of rotation of the motor 20, and the like.

Other noteworthy items in FIG. 1 involve gears 34 and 35, which are connected to the output shaft of the motor and to the housing of the rotating optical arrangement 14, respectively. The particular motor we use rotates at 1725 rpm and has a 12 to 1 speed reduction arrangement, which of course means that by use of an appropriate speed control, the rotative speed of the optics unit may be increased from a very slow speed, up to a desired cutting speed, with a top speed being say 144 rpm. Also, as will be pointed out hereinafter in some detail, it is necessary from time to time to change the focus of the optical arrangement, and this may be accomplished by the use of a focus adjustment screw 36, whose rotation is controlled typically by inserting an Allen wrench through hole 38 disposed somewhat above orifice 22.

Figure 3:
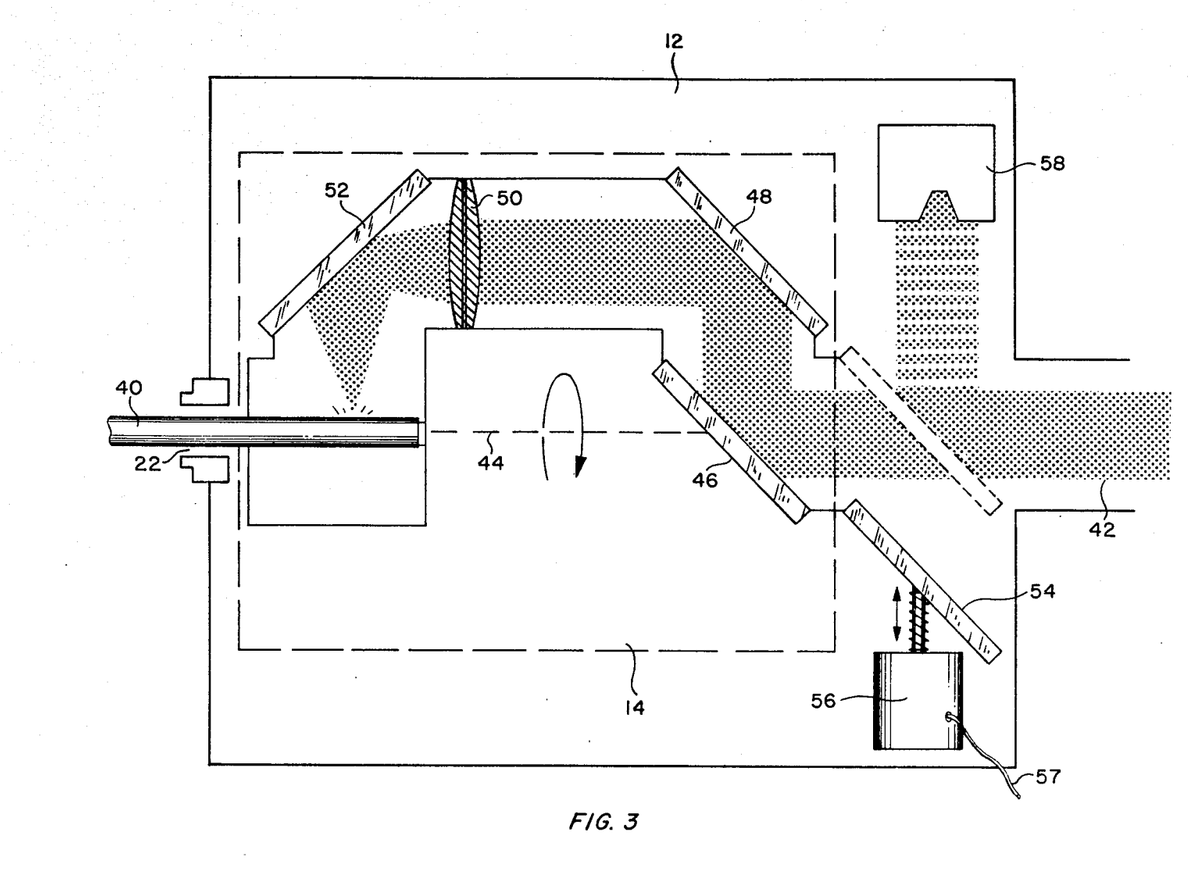
FIG. 3 is a cross sectional view of an idealized form of our rotatable optical unit, showing the path of laser energy through the unit during a typical operation, and the concentration of such energy on the insulation of a wire to be stripped.

Turning to FIG. 3, we have there revealed a simplified showing of an exemplary arrangement of the rotatable optics utilized in accordance with this invention for redirecting the path of the laser beam so that it intercepts the insulated lead 40 at a right angle. The rotatable optics are indicated by a dashed line, and the cabinet 12 by a surrounding solid line. The laser beam 42 is presumed to be entering from the right, as viewed in FIG. 3, with the central axis of the beam coinciding with the axis of rotation 44 of the rotating optics 14. During the operation of our device, the entering beam strikes the first mirror 46, which is normally disposed at a 45° angle to the entering light. The approximate center of mirror 46 substantially coincides with the central axis of the laser beam 42 entering the housing, as well as coinciding with the axis of rotation 44 of the housing. After striking the first mirror, the laser beam is directed toward the second mirror 48, with which the first mirror maintains a fixed relationship during rotation of the optical unit 14. The mirror 48 is likewise preferably directed at a 45° angle to the axis of rotation of the optical housing. Thereafter, the laser beam is directed essentially parallel to the axis of rotation of the optical housing, and during this leg of its travel, the laser beam can pass through a lens 50 whose position in the housing is adjustable in the direction along the beam, so that focusing of the beam can be effectively carried out.

Thereafter, a third mirror 52, whose position with respect to the other two mirrors is fixed, serves to bend the laser beam in a 90° angle, which of course causes the laser beam to strike the insulation of the lead 40 at the desired 90° angle. We typically use radiation at 10.6 μ inasmuch as radiation at this frequency causes rapid ablation of the insulation, but does not harm the conductor.

There are two major reasons why the laser radiation affects the insulation and the conductor portions of the insulated lead differently. The first factor involves the conductor being metallic, which means that it is highly reflective to the wavelength chosen, even through this wavelength is highly absorbed by the insulating material disposed around the conductor. Secondly, the thermal conductivity of the conductor is very high, which means that the energy from the laser, though concentrated, is nevertheless in effect spread over a wide area of the conductor, thus allowing the conductor to remain undamaged.

As schematically indicated in FIG. 3, we utilize a movable mirror 54 for controlling the application of the laser beam to a lead inserted through the orifice 22 on the axis of rotation of the optics unit 14, latter mirror being supported in the cabinet 12 in such a manner as not to be rotatable with the rotating optical unit 14. Although for the sake of simplicity, the mirror 54 is shown in a plane essentially parallel to first mirror 46, it is to be understood that there is no requirement that the movable mirror 54 be in that position. For example, there are many other positions it could be in, including a position 90° to the position shown in FIG. 3, or in other words, in a position in which the mirror 54 can be movable in and out of the plane of the paper. Although many different mirror controlling arrangements may be utilized, we prefer to use a foot-pedal-operated solenoid 56 for moving the mirror 54, and we prefer for the mirror to be spring biased into the position shown by dashed lines in FIG. 3, which of course is a position in which it serves to block the laser beam from traveling through the rotatable housing 14. When in the dashed line position, the mirror directs the entire radiation from the laser at a power meter 58 that is utilized to monitor the power level of the laser. By virtue of this arrangement, the operator can read from the meter 18, the amount of powder being delivered to the power meter by the laser in housing 24, and then make any necessary power level adjustments accordingly. Then, by stepping on his foot switch, shown at 28 in FIG. 2, the operator can cause the mirror 54 to move against its spring bias, into the operating position shown in full lines in FIG. 3. Subsequent removal of his foot from the foot pedal deactivates the solenoid and allows the mirror 54 to return to its normal dashed line position, in which it blocks radiation from striking the three mirrors 46, 48 and 52.

Figure 4:
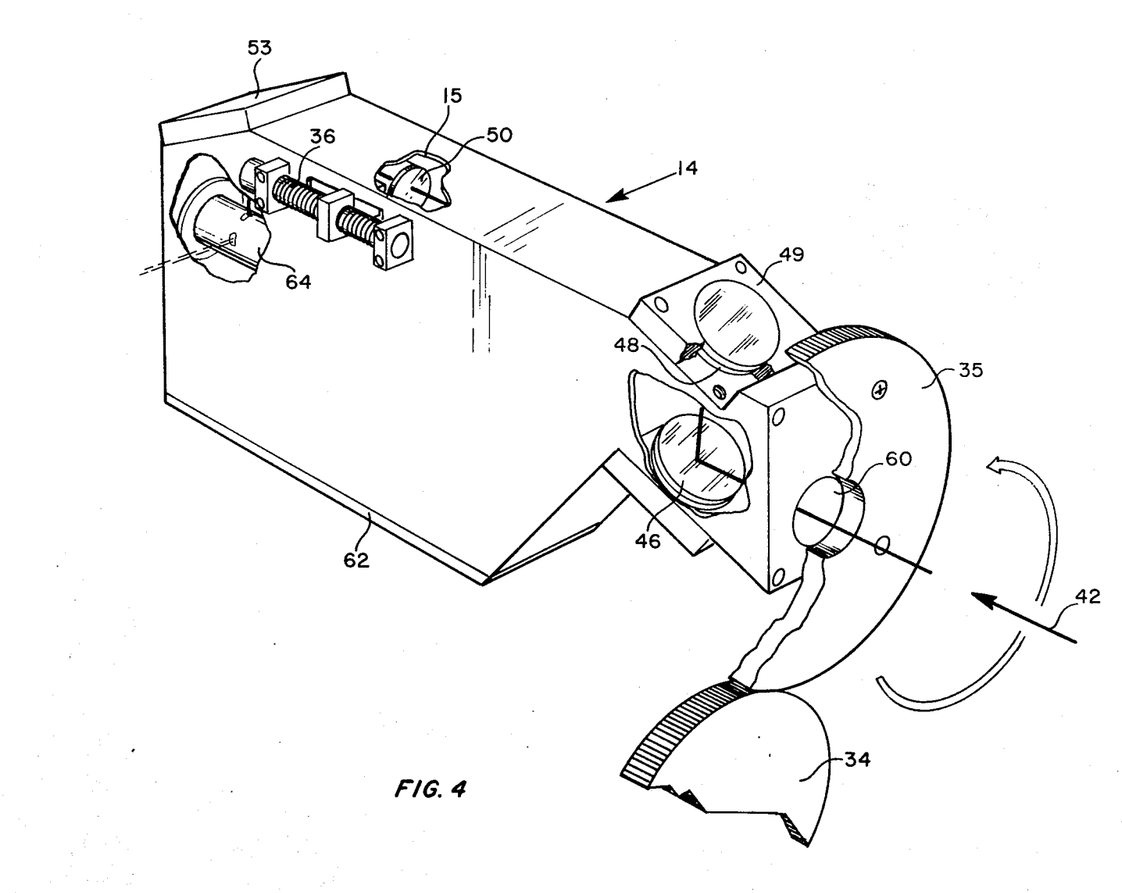
FIG. 4 is a perspective view of the exterior of our rotatable optical unit, with certain portions removed so that internal construction can be revealed.

Turning now to FIG. 4, it will there be seen that we have depicted the rotating optical unit 14 by means of a perspective view, with the unit being rotatable in the direction indicated by the curved arrow. This unit is preferably defined by an aluminum housing 15 that has been drilled parallel to the axis of rotation in order to receive several of the optical components, and drilled along its axis of rotation in order for it to receive the laser beam as well as an elongate component 64 known as a wire insertion tube or lead holder. The component 64 is typically made of aluminum, and its constructional details will be discussed at length hereinafter.

As before, the laser beam may be regarded as entering from the right, but in FIG. 4 the beam is characterized by a series of arrows. An aperture 60 is provided on the center of rotation of the driven gear 35, and in the front of the housing. The aperture permits the beam arriving on the center of roation of the housing to strike the active surface of first mirror 46, then second mirror 48, latter being disposed in a mirror housing 49. The beam then passes through lens 50, and is thereafter redirected by the active surface of mirror 52, only the housing 53 of which is visible in FIG. 4. The beam thus is directed at the insulated lead, with the wire insertion tube 64 rather than the lead itself being visible in this figure.

Because of the irregular configuration of the housing 15 of the optical unit 14 and the arrangement of components therein, it is necessary to add a counterweight in order for it to be dynamically balanced. Typically, the counterweight takes the form of a stainless steel plate 62 that is bolted or otherwise fastened to the bottom of the housing 15, although other arrangements could of course be made if desired. Also visible in this figure is the focus adjustment screw 36, with the position of the screw assembly shown in FIG. 4 being the preferred position.

Figure 5:
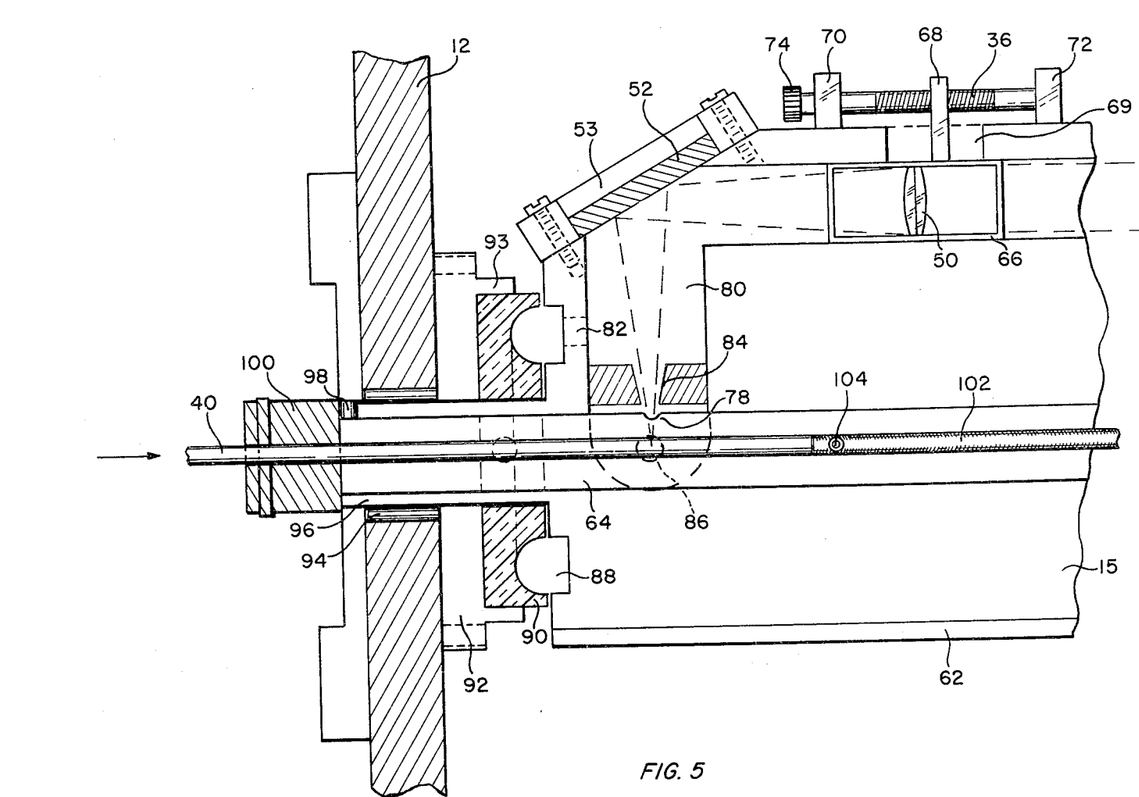
FIG. 5 is a cross sectional view of a portion of an actual operating unit, to reveal construction of certain aspects of the unit.

Turning to FIG. 5, it will there be seen that we have illustrated a portion of the optical unit 14 in a more realistic form than shown in FIG. 3, with this figure revealing the rotating wire insertion tube 54 inserted in the operative position on the axis of rotation of the housing 15.

The laser beam may be regarded as entering from the right, with this figure not revealing the beam passing through the first and second mirrors 46 and 48, but rather illustrating the beam passing through lens 50, and then being directed by the active surface of mirror 52 at the insulated lead 40. As will be noted, the lens assembly 50 is contained in a cylindrical holder 66, whose position is longitudinally adjustable so that the focusing of the laser beam upon the lead 40 contained in the tube or holder 64 may be easily brought about. Extending upwardly from the lens holder 66 is a member 68, which is confined to movement in slot 69. The interior of member 68, which is confined to movement in slot 69. The interior of member 68 is threaded so that it can threadedly receive the focus adjustment screw 36. Longitudinal movements of the screw 36 are prevented by mounting members 70 and 72, in which the screw can nevertheless freely rotate. Rotational adjustments of the screw to bring about focusing of the optics may be accomplished by rotation of the knob 74, but in practice the screw is adjusted by providing an Allen head on the screw, and then inserting a long Allen wrench through the hole 38 illustrated in FIG. 1, that is provided in the wall of the cabinet 12 at the appropriate location. Although for clarity we have shown the screw 36 and other details of the focusing arrangement located above the lens assembly 50, in practice we typically locate this assembly to one side of the lens 50, as previously mentioned in connection with FIG. 4.

It should be noted in passing that the zero adjustment position for the lens assembly 50 is the location at which the energy from the laser is focused on the centerline of the holder 64, which centerline of course coincides with the axis of rotation of the housing 15. Therefore, if the insulation on a small lead or wire is to be stripped, only a small adjustment need be made, and for example, in stripping the end of one lead involving a 22 AWG twisted pair, a setting of 0.015 in. was appropriate to focus the laser energy on the insulation of the lead. Leads as large as ½ in. in diameter can be rapidly stripped in accordance with one preferred embodiment of this invention, and in such an instance a large adjustment or setting would be appropriate, for in all instances, we endeavor to direct the laser beam onto the insulation using a sharp focus in order to bring about a straight-sided cut of the insulation, leaving the insulation remaining on the lead undamaged. Also, the cut is much more rapid when the focus is sharp.

In order for the focused laser beam to be directed onto the insulation of the lead 40 at a desired location, it is necessary to provide a hole at the appropriate location in the wire insertion tube 64. Since the tube or holder 64 rotates with the optical unit 14, only a single hole 78 need be provided for the entry of the laser beam, latter hole being visible in FIG. 5, but more clearly apparent from FIG. 6.

Figure 6:
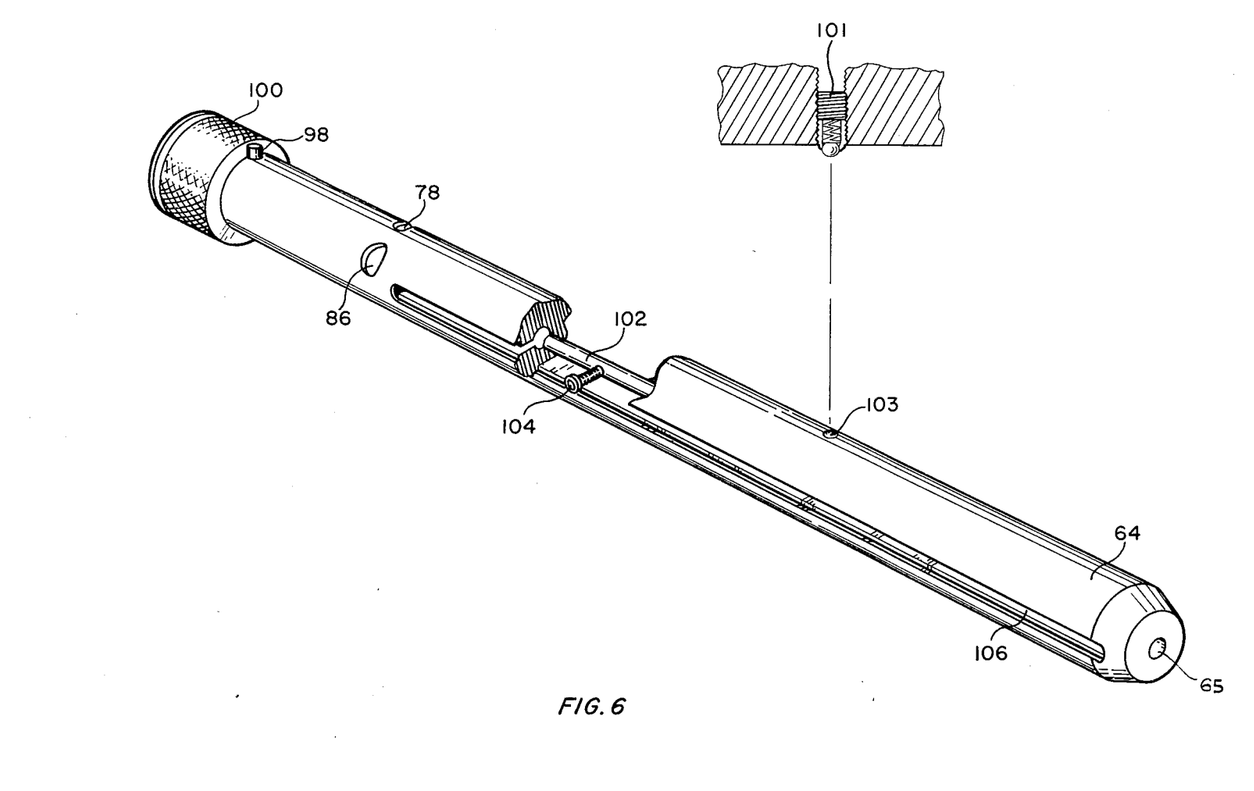
FIG. 6 is a perspective view of the wire insertion tube usable in our rotatable optical unit in order that the length of the stripping operation to be conducted can be carefully regulated.

Turning now to a detailed study of FIG. 6, it will be noted that wire insertion tube 64 is provided with longitudinal hole 64 along its center axis, in which a rod 102 is slidably disposed. The wire whose end is to be stripped is of course inserted into the remote end of hole 65 as viewed in FIG. 6, or in other words through the orifice 22 adjacent the knurled knob 100. The lead can enter only to the depth permitted by the positioning of rod 102 in a given instance. This is to say, by appropriate longitudinal placement of the rod 102 in the tube 64, the extent to which the insulation of the wire is stripped can be easily controlled. A screw 104 is threadedly disposed in the rod 102, and a slot 106 extending for a substantial portion of the length of the tube 64 can accommodate the screw and permit a considerable amount of lengthwise adjustment of the rod 102. Thus, when the rod has been moved along the interior of the tube until such time as the distance between the end of the rod and the hole 78 is equal to the extent to which insulation is to be removed from the lead, the screw 104 is tightened until the undersurface of the head of the screw tightly bears against the outer sidewall of the tube 64, which of course then holds the rod 102 firmly in the chosen position in the tube. As a result of this arrangement, the user can strip a large number of wires to an identical extent without any other movements or precautions needing to be made.

Since it is well within the capability of our invention to be able to strip a large number of different types of insulation from leads of a wide range of sizes, we typically stock wire insertion tubes 64 of several different internal diamter. This is done so as to make it conveniently possible to dispose a given lead to be stripped, as close as possible to the axis of rotation of the housing 15 and the wire insertion tube that is carrying the lead, for reasons involving the focus of the energy from the laser. Obviously, the centering of the lead could not be accomplished if the interior of the tube 64 used is of a considerably larger diameter than the lead to be stripped.

Figure 7:
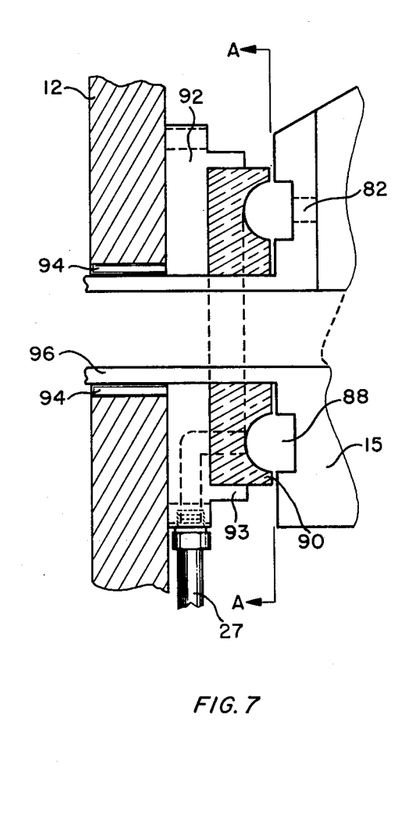
FIG. 7 is a cross sectional view taken through the end of the rotatable optical unit in order to reveal the plenum utilized in order that purge gas may be employed during a stripping operation.

During the action of the focused laser energy upon the insulation of the lead 40 in order to cause its vaporization and/or ablation, considerable quantities of waste material and gases are evolved, which have led to the use of a purge arrangement that is useful in preventing an undesirable buildup of material in the optical cavity 80 that was formed during the drilling of the optical housing to accommodate the optical components. If not rapidly removed from the optical cavity, the burning insulation would likely form an undesirable coating on the optical surface of mirror 52, and on the side of lens 50 nearest the cavity. Accordingly, we provide a gas inlet 82 in the sidewall of the rotating housing such that nitrogen or other suitable inert gas or gas mixture can be admitted to the cavity 80, which inlet is visible in FIG. 5 and 7. The purging gas exits from the cavity 80 through orifice 84 in the bottom of the cavity, and thence enters the hole 78 in the wire insertion tube 64; see FIG. 5. This of course is the same hole through which the laser beam enters. Thereafter, the purging gas exits through one or more holes 86 in the tube 64 (see FIG. 6), with suitable connections (not shown) being provided so that the purging gas can then exit from the rotating optical unit into the interior of cabinet 12, from which it can thereafter be removed by a blower fan or the like.

Purging gas is supplied to the gas inlet 82 from a circularly disposed plenum 88, to which is connected a pipe 27 leading from the purge gas tank 26. This plenum is partially defined by a circular groove cut in one end of the housing 15 of unit 14, and partly defined by a circular groove of the diameter formed in circular member 90; see FIGS. 5, 7 and 8. Teflon is preferred for the construction of this non-rotating member inasmuch as this material has excellent wear characteristics. It is not desirable for the teflon member 90 to make physical contact with the rotating housing 15, and preferably its near edges are spaced a few thousands of an inch away from the near edge of the housing so that only a minimal amount of purge gas escapes.

Figure 8:
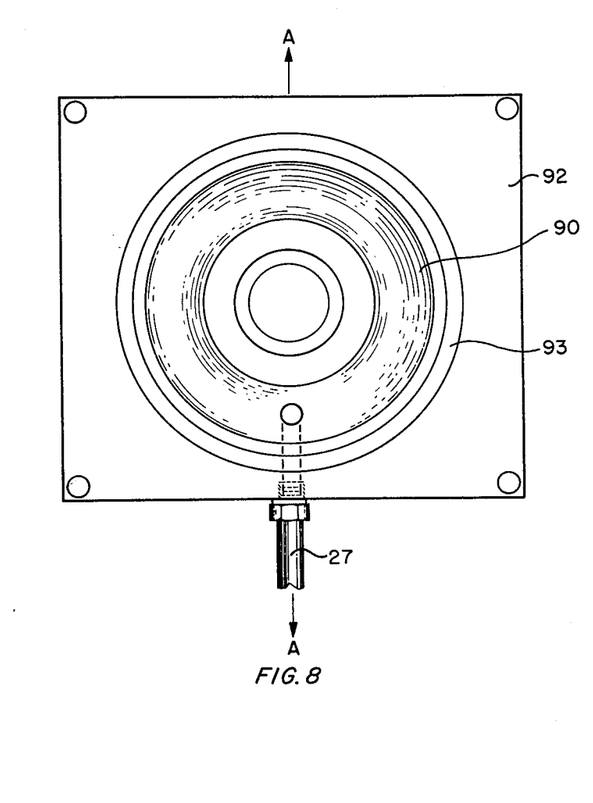
FIG. 8 is a view relatable to FIG. 7, revealing the use of a teflon ring in connection with the nonrotating part of the plenum.

It is known that teflon tends to undergo a certain amount of cold flow during a utilization such as this, so we prefer to support the teflon member by an adapter plate 92 secured to the interior of cabinet 12, which plate has an upstanding ring 93 that serves to confine the periphery of the teflon and prevent cold flow. The adapter plate is visible in FIGS. 5, 7 and 8, and the mounting details are best seen in FIG. 8.

The housing 15 of the rotating optical unit is preferably supported at the end remote from the gear 35 by the use of needle bearings 94 that are supportively mounted in the wall of cabinet 12. However, if not desirable to support the optical unit from the cabinet wall, a form of cradle, involving two spaced, upstanding arms could be used to rotatively support the housing 15. Extending outwardly from the housing is a hollow extension or tubular member 96 that resides on the interior of the needle bearings. Therefore, as the unit 14 is driven in rotation, the extension 96 also rotates, thus forming an ideal rotating support for the wire insertion tube 64. Rotation of the tube 64 with the member 96 and the rest of the housing 15 is assured by providing a pin 98 fixed adjacent the knurled knob 100 of the tube 64, and slotting the extension member 96 to receive the pin 98 at the rotative location where hole 78 in the tube 64 will best receive the focused laser beam directed through the orifice 84. Accidental withdrawal or displacement of the tube 64 from the properly aligned position in the housing 15 is prevented by providing a conical indentation on the surface of the tube 64, and then providing a ball detent arrangement in the housing 15 at a location such that the ball of the ball detent will fit into the indentation in the tube only when the tube has been inserted into the housing 15 to the correct depth, where the hole 78 properly aligns with the orifice 84.

Figure 9:
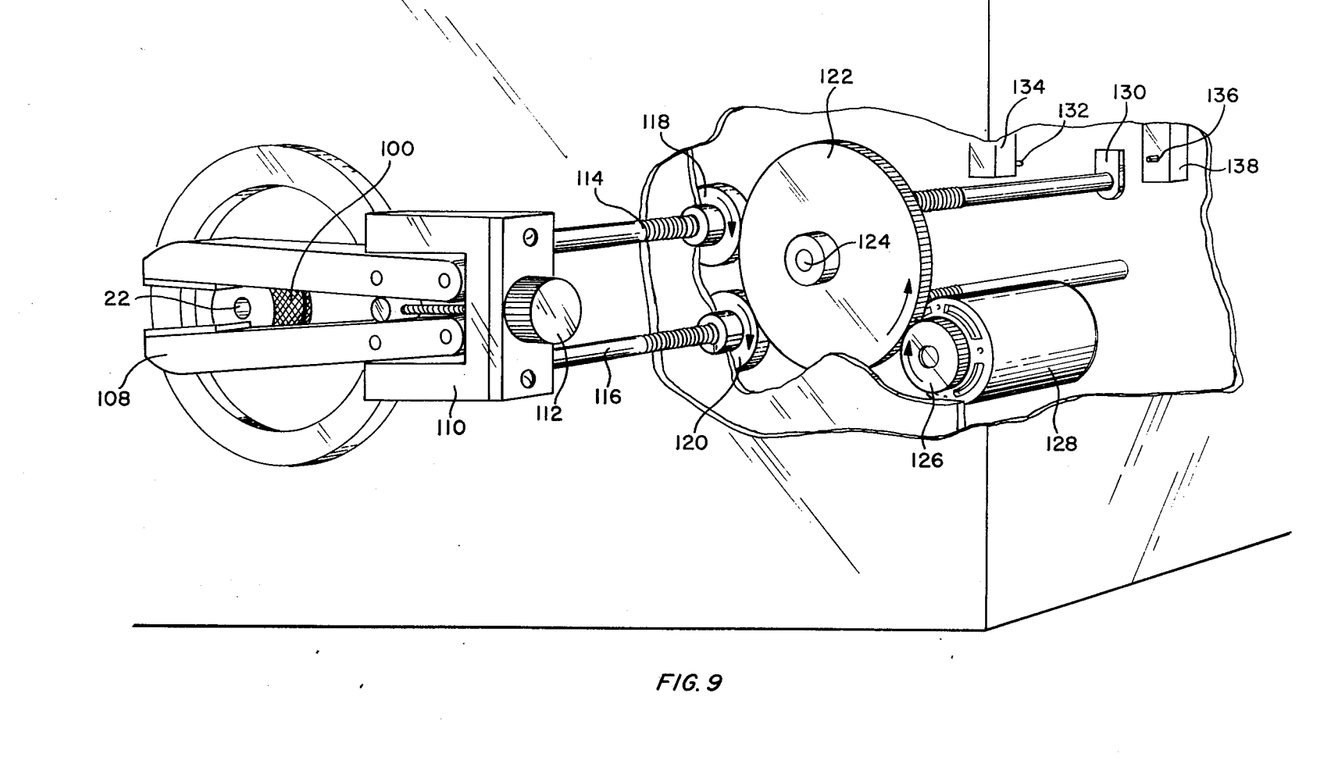
FIG. 9 is a perspective view of an embodiment of our invention, in which the wire being stripped can be withdrawn from the unit in an automatic manner.

Turning to FIG. 9, it will there be seen that we may utilize an extractor arrangement for accomplishing a withdrawal of the insulated lead wire 40 at a controlled rate, when a longitudinal cut along the wire lead is desired. A cut of this type is desirable on certain occassions, such as when the insulation clings very tightly to the lead, and is not conveniently removed after a circumferential cut at the desired location on the insulation has been accomplished. For example, when the lead involved is made up of a twisted pair of wires that has been wrapped with fluorinated ethylene propylene tape and sintered, the severed end of insulation cannot be extruded off the end of the wires. In such an instance, it is most important that a longitudinal cut be made.

It will be noted in FIG. 9 that we have provided a pair of arms or tongs 108 of a size and configuration that on occasion can easily grasp the lead. These arms 108 are supported from a crosshead 110, with a solenoid 112 mounted on latter device that, when energized, accomplishes the desired grasping motion. Quite obviously, when solenoid 112 is de-energized, the arms 108 release their grip on the lead 40. Rubber pads or the like on the gripping surfaces of the arms 108 prevent damage to the lead.

The non-rotative threaded rods 114 and 116 utilized for supporting the crosshead 110 extend through the wall of the cabinet 12, with these rods being supportively contained in rotatable gear members 118 and 120 mounted in suitable bearings (not shown) that are in turn mounted in supporting bracket 117. These gear members are interiorly threaded so as to properly engage the threads of rods 114 and 116.

Teeth on the exterior of gear members 118 and 120 are in mesh with the teeth of large gear 122, latter being rotatable on mounting axis 124 that is also supported by bracket 117, and caused to rotate by interaction with driving gear 126 mounted on the output shaft of motor 128. Accordingly, upon the motor 128 being energized to turn the driving gear in the clockwise direction, it brings about the rotation of gear 122 in the direction appropriate to cause the gear members 118 and 120 to rotate and bring about an outward movement of the threaded rods 114 adn 116 from the cabinet, at a rate appropriate for a longitudinal cut. Rotation of the motor 128 in the opposite direction obviously causes the arms 108 to be drawn back to a position adjacent the cabinet 12.

Preferably, we utilize an automatic arrangement for bringing about the operation of motor 128. For example, the extractor apparatus may be activated at the end of a circumferential burn either by operation of a timing circuit, or a revolution counter. The setting of devices of either type may of course be made subsequent to a series of tests run to establish for a given type and thickness of insulator, how much time, or how many revolutions of the optical unit 14 are required in order for the laser beam to burn through such insulation.

Upon the solenoid 112 and the motor 128 being energized, withdrawal of the lead 40 is brought about slowly and uniformly until such time as plate 130 on the trailing end of shaft 114 contacts the actuator portion or button 132 of microswitch unit 134. The closing of microswitch 134 causes the deenergization of solenoid 112 and a reversal of the direction of operations of motor 128, thus bringing about a return of the rods 114 and 116 into the cabinet. The motor 128 is shut off by the plate 130 coming into contact with button 136 of microswitch unit 138. Unit 138 may be arranged to accomplish the rest of the direction controller for motor 128, so that the motor will turn in the direction appropriate for withdrawal of the lead from the tube 64 at the time of the next withdrawal cycle.

As to the operation of our device, the logical first step is to put the laser in operating condition. As previously indicated, we prefer to use a $CO_2$ laser, which of course, involves a principal discharge tube having a full silvered mirror at one end, and a half-silvered mirror at the end through which the discharge of energy is directed. Means are provided for establishing a suitable high voltage between a cathode adjacent one end of the discharge tube, and an anode adjacent the other end. A water jacket typically surrounds the discharge tube, through which a flow of water can be established in order to prevent overheating.

Before applying the high voltage, a suitable mixture of $CO_2$ with nitrogen and another gas such as helium is utilized to charge the discharge tube, this charging taking place through a restriction or small orifice. The valve on the gas inlet manifold is opened and the gauge on this manifold should read 50 p.s.i.g. Then, the main power switch on the control console 30 is turned on which, among other things, cuases a vacuum pump connected to the gas discharge tube to run and to pull a vacuum on the interior of the discharge tube. The vacuum pump is allowed to operate until the pressure in the gas discharge tube is brought down to less than 1 torr, with this of course establishing the integrity of the system. Thereafter, the valve is opened on the gas manifold so that the pressure in the manifold can be brought up to 3 torr.

The power switch is now turned on so as to establish a voltage difference of between 15 kv and 30 kv between the anode and cathode. A Raise Voltage control is turned until a current meter in one of the power leads indicates that 40 milliamperes is flowing through the interior of the gas discharge tube between the cathode and anode.

The operator then checks the reading of the power meter 18 located on the panle 16 of the wire stripper, and adjusts the power level accordingly.

To increase laser power, the Raise Voltage control on the control console 30 is turned and the gas pressure in the discharge tube increased commensurately. In the present instance, the Raise Voltage control may be turned until the current meter indicates say 60 milliamperes, with the gas pressure then being increased until the current drops back to 50 milliamperes. These two steps are repeated in an appropriate manner until such time as the pressure in the gas discharge tube has increased to 10 torr. If still higher power is desired, a pressure of 10 torr should be maintained and the current raised, but in the laser employed in the present instance, a current of 80 milliamperes should not be exceeded.

As should be obvious, any of a number of different lasers could be utilized, and we do not attach inventive significant to the particular one that is employed.

As to the operation of our novel wire stripper, a valve in the line 27 from nitrogen bottle 26 is opened so that nitrogen will be supplied to the plenum 88, with the pressure at the nitrogen regulator typically being 25 p.s.i.g.

The power switch on the panel 12 should be turned to the on position, and the meter 18 zeroed. The motor control power should be turned to the on position, the motor direction control set to the forward direction, and the motor speed control set to a desired speed.

The wire insertion tube 64 should be removed from the housing 15 and a check made that the particular tube utilized conforms to the size of the lead or leads to be stripped, for a sharp focus of laser energy cannot be maintained on the insulation of the lead if the interior diameter of the tube 64 is considerably larger than the lead whose end is to be stripped. While the wire holder is out of the machine, the screw 104 is loosened, the rod 102 set for the desired stripping length, and then the screw 104 tightened so as to maintain the rod in the desired longitudinal position in the holder 64.

With the laser operating at the proper power level, an adequate flow of nitrogen taking place through the optical chamber 80, and the wire holder 64 set for the desired length, a first wire is ready to be stripped. If the lead is of a type that has not previously been stripped, the operator should typically set the speed control to approximately 50% of the full speed of motor 20, and set the laser output to approximately 15 watts. The focus adjustment 36 should be set to correspond to one half of the diameter of the wire, and the wire to be stripped then inserted into the aperture 22 such that the wire bottoms agains the wire stop 102.

At this point, the operator steps on foot control 23, thus causing power to be conducted by lead 57 to the solenoid 56, resulting in it being energized to cause mirror 54 to move against its spring bias out of the interfering position, and into the operative position shown in FIG. 3 in full lines. This latter is of course the position that allows the laser beam to impinge upon the insulation of the lead 40 to be stripped. If desired, an electrically operated valve can be disposed in the nitrogen line 27, and also energized by the depressing of the foot switch 28. In this manner, a flow of nitrogen can be caused to commence only when a cut is to take place. A further option is to but a brief time delay in the circuit of solenoid 56 so that the mirror 54 will not be moved until such time as a nitrogen flow through chamber 80 has had time to be established.

In the aforementioned instance in which the operator has not had previous experience with the stripping of a given wire, and does not have available a chart or schedule setting forth for the wire at hand, the ideal motor speed, laser power level, and the like the operator should, after setting the speed and power levels as indicated above, start by maintaining his or her foot on the pedal 28 for a one second exposure time, after which the lead should be removed from the holder 64 and the circumferential cut inspected. The operator should particularly notice characteristics such as burn width, charring levels, and depth of cut. If the burn width is greater than approximately 1/32nd of an inch, further adjustment of focus is warranted. Efforts to obtain the correct focus should be continued until such time as the width of cut has been minimized.

When satisfactory focus has been achieved, the operator should then concentrate on minimizing the residue accumulation on the wire. Typically fast rotation speeds of the unit 14 and low laser power yield the cleanest cut, so this indicates that the operator should vary the motor speed and the power yield until a desirably clean cut is achieved.

It is preferable to minimize the power setting, so that the wire will not be adversely affected, but of course if the power output of the laser is turned down too far, a desirably high production rate cannot be achieved. Power level can be increased incrementally to at least 50 watts should the utilization of this amount of power become necessary, and even 100 watts of power may on occasion be desirable.

The following information is presented by way of illustrating some of the uses to which our laser wire stripper has been put, and the operating characteristics of the machine during such utilizations. In the instances in which the circumferential cut is followed by a longitudinal cut, the operator may cause the motor 128 to commence the withdrawal sequence at the desired time, or alternatively, suitable automatic means may be relied upon to cause the commencement of the withdrawal sequence after sufficient time for the completion of the circumferential cut, considering the insulation utilized, has elapsed.

| BASIC WIRE CATEGORIES | | INSULATION MATERIAL | WIRE STRIPPER PARAMETERS | |
|---|---|---|---|---|
| H Film | Twisted Pair 22 AWG Circumferential Cut & Longitudinal Cut | Polyimide Film & FEP Tape | Power Focus Exposure Extraction | 20 watts + 0.015 inch 2.5 sec. 1"/sec. |
| RG 180 | Coaxial Cable Circumferential Cut & Longitudinal Cut | Fluorinated-ethylene-propylene outer jacket | Power Focus Exposure Extraction | 10 watts + 0.018 inch 1.0 sec. 2"/sec. |
| RG 142 | Coaxial Cable Circumferential Cut & Longitudinal Cut | Fluorinated-ethylene-propylene | Power Focus Exposure Extraction | 20 watts + 0.025 1.0 sec. 2"/sec. |
| Ord. drwg 11181210 | Coaxial Cable Circumferential Cut & Longitudinal Cut | Polyvinylchloride | Power Focus Exposure Extraction | 20 watts 0.037 1.0 sec. 1"/sec. |
| Ord. drwg 11185062 | Polyalkine Twisted Pair Circumferential Cut | Polyvinylidene fluoride | Power Focus Exposure | 5 watts .025 1.0 sec. |
| Ord. drwg 11181014 | Multi-conductor-Nylon SJ Circumferential Cut | Nylon | Power Focus Exposure | 2.5 watts .1025 1.0 sec. |
| Ord. drwg 11182900 | Sheath Cable (to .050) | PVC | Power Focus Extraction Exposure | 35 watts variable ½ in/sec. 3–5 sec. |

The settings for the focus adjustments set forth above are with reference to a basic setting, such as 0.062 inches.

As is obvious, our invention can be used in conjunction with insulated wire leads that are either circular in cross section, or else are somewhat elliptically shaped. In this latter instance, the focusing of the beam upon the insulation becomes somewhat of a compromise, in that is is usually desirable to focus the laser beam on a mid radius of the insulated wire, rather than on a portion corresponding to either the major diameter or the minor diameter of the wire.

It is to be realized in dealing with twisted pairs, or other types of twisted wire, that the wrap may be either to the left or to the right. Although the direction or rotation of the motor 20, and consequently the direction of rotation of the optical unit 14 are usually unimportant when circumferential cuts are being made, when making longitudinal cuts, it is often desirable to cause the optical head 14 to rotate slowly in a direction appropriate to the twist of the lead being stripped as the cut is being made during wire withdrawal from the aperture 22. The resulting cut is of course in the form of a helix. The steepness of the helix can be controlled by establishing a careful relationship between the rotational speed of the unit 14 and the speed of motor 128.

We claim:

1. A device for enabling the selective stripping of a portion of the insulation from an electrical lead on a rapid basis without damage to the conductor portion of the lead, comprising a rotatable optical unit having an aperture at each end, a first of said apertures being configured to receive a variety of sizes and types of electrical leads whose ends are to be stripped of insulation for a selected length, and the second of said apertures being arranged to receive output energy from an adjacently located laser operating at a wavelength and power level such as will cause the ablation of insulation, each of said apertures being disposed essentially on the axis of rotation of said optical unit, and optical components disposed in said optical unit at locations between said apertures for appropriately re-directing the laser energy entering through said second aperture, said optical components being responsible for directing and focusing a laser beam upon a nonrotating lead inserted through said first aperture, such laser beam, because of the rotation of said optical unit, providing a circumferential cut in the insulation of the electrical lead at a location selected by the user, thus to enable the removal of such selected portion of the insulation from the conductor of the lead.

2. The device for stripping insulation from an electrical lead as defined in claim 1 in which said first aperture is configured to receive a lead holder, said lead holder having an elongate hole on its principal axis in which is disposed a movable abutment, said abutment being movable to any of a large number of selected locations, thus making it possible to determine the depth to which the electrical lead to be stripped can be inserted.

3. The device as defined in claim 2 in which a plurality of lead holders is provided, so as to be usable interchangeably in said optical unit, said lead holders having elongate holes of varying sizes, thus making it possible to properly accommodate leads of different diameters.

4. The device as defined in claim 1 in which movable blocking means is operatively associated with said second aperture, such that energy from the adjacent laser normally cannot reach the vicinity of said first aperture, and means for selectively causing said blocking means to move to an operative position out of the path taken by the energy output from the laser at such time as a lead is to be stripped.

5. The device as defined in claim 4 in which said means for selectively controlling said blocking means is under the control of the operator.

6. The device as defined in claim 4 in which said blocking means utilizes a reflecting surface, which causes the laser energy from the adjacent laser to be directed into a power meter when said blocking means is in the position away from the position allowing a lead to be stripped, and readout means operatively associated with said power meter, thus to enable the operator of the device to ascertain whether the power level of the laser is appropriate for a given wire stripping operation.

7. The device as defined in claim 1 in which said optical unit can be operated either in a rotating mode enabling a circumferential cut to be made in insulation, or a non-rotating mode enabling a longitudinal cut to be made in such insulation.

8. The arrangement as defined in claim 7 in which means are provided for bringing about the withdrawal at a controlled rate of a lead inserted into said optical unit while laser energy is being directed at the insulation of the lead, thereby to achieve a longitudinal cut simplifying the removal of the insulation.

9. The device as defined in claim 1 in which said optical unit can be operated in a mode enabling a helical cut to be made in such insulation, involving the slow rotation of said optical unit as the lead is being withdrawn.

10. A device for enabling the selective stripping of a portion of the insulation from an electrical lead on a rapid basis without damage to the conductor portion of the lead, comprising an optical unit having an aperture configured to receive an electrical lead whose end is to be stripped of insulation for a selected length, said optical unit having an additional aperture, arranged to receive output energy from an adjacently located laser operating at a wavelength and power level such as will cause the ablation of insulation, and optical components disposed in said optical unit at locations between said apertures for appropriately re-directing the laser energy entering through latter aperture, said optical components being responsible for directing and focusing a laser beam upon a lead inserted through said first mentioned aperture, such laser beam providing a cut in the insulation of the electrical lead at a location selected by the user, thus to enable the removal of such selected portion of the insulation from the conductor of the lead.

11. The device as defined in claim 10 in which said optical unit can be operated either in a rotating mode enabling a circumferential cut to be made in the insulation, or in a non-rotating mode enabling a longitudinal cut to be made in such insulation.

12. The device for stripping insulation from an electrical lead as defined in claim 10 in which said first aperture is configured to receive a lead holder, said lead holder having an elongate hole on its principal axis in which is disposed a movable abutment, said abutment being movable to any of a large number of selected locations, thus making it possible to determine the depth to which the electrical lead to be stripped can be inserted.

13. The device as defined in claim 12 in which a plurality of lead holders is provided, so as to be usable interchangeably in said optical unit, said lead holders having elongate holes of varying sizes, thus making it possible to properly accommodate leads of different diameters.

14. The device as defined in claim 10 in which movable blocking means is operatively associated with said second aperture, such that energy from the adjacent laser normally cannot reach the vicinity of said first aperture, and means for selectively causing said blocking means to move to an operative position out of the path taken by the energy output from the laser at such time as a lead is to be stripped.

15. A device for enabling the selective stripping of a portion of the insulation from an electrical lead on a rapid basis without damage to the conductor portion of the lead, comprising an optical unit capable of nonrotational operation, as well as operation at selected rotational speeds, said unit having an aperture at each end, a first of said apertures being configured to receive a variety of sizes and types of electrical leads whose ends are to be stripped of insulation for a selected length, and the second of said apertures being arranged to receive output energy from an adjacently located laser operating at a wavelength and power level such as will cause the ablation of insulation, and optical components disposed in said optical unit at locations between said apertures for appropriately re-directing the laser energy entering through said second aperture, said optical components being responsible for directing and focusing a laser beam upon a non-rotating lead inserted through said first aperture, such laser beam, during rotational operation of said optical unit, providing a circumferential cut in the insulation of an inserted electrical lead at a location selected by the user, and during non-rotational operation, providing a longitudinal cut in the insulation of an inserted electrical lead at a selected location, thus in each instance serving to simplify the removal of such selected portion of the insulation from the conductor of the lead.

16. The device for stripping insulation from an electrical lead as defined in claim 15 in which said first aperture is configured to receive a lead holder, said lead holder having an elongate hole on its principal axis in which is disposed a movable abutment, said abutment being movable to any of a large number of selected locations, thus making it possible to determine the depth to which the electrical lead to be stripped can be inserted.

17. The device as defined in claim 16 in which a plurality of lead holders is provided, so as to be usable interchangeably in said optical unit, said lead holders having elongate holes of varying sizes, thus making it possible to properly accommodate leads of different diameters.

18. The device as defined in claim 15 in which movable blocking means is operatively associated with said second aperture, such that energy from the adjacent laser normally cannot reach the vicinity of said first aperture, and means for selectively causing said blocking means to move to an operative position out of the path taken by the energy output from the laser at such time as a lead is to be stripped.

19. The device as defined in claim 18 in which said means for selectively controlling said blocking means is under the control of the operator.

20. The device as defined in claim 18 in which said blocking means utilizes a reflecting surface, which causes the laser energy from the adjacent laser to be directed into a power meter when said blocking means is in the position away from the position allowing a lead to be stripped, and readout means operatively associated with said power meter, thus to enable the operator of the device to ascertain whether the power level of the laser is appropriate for a given wire stripping operation.

21. The arrangement as defined in claim 15 in which mean are provided for bringing about the withdrawal at a controlled rate of a lead inserted into said optical unit while laser energy is being directed at the insulation of the lead, thereby to achieve a longitudinal cut simplifying the removal of the insulation.

22. The device as defined in claim 15 in which said optical unit can be operated in a mode enabling a helical cut to be made in such insulation, involving the slow rotation of said optical unit as the lead is being withdrawn.

* * * * *